United States Patent
Katayama et al.

(10) Patent No.: US 8,346,080 B2
(45) Date of Patent: Jan. 1, 2013

(54) OPTICAL NETWORK SYSTEM AND MEMORY ACCESS METHOD

(75) Inventors: Yasunao Katayama, Kanagawa (JP); Atsuya Okazaki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 12/764,206

(22) Filed: Apr. 21, 2010

(65) Prior Publication Data

US 2010/0272439 A1   Oct. 28, 2010

(30) Foreign Application Priority Data

Apr. 22, 2009   (JP) ................................. 2009-103809

(51) Int. Cl.
*H04B 10/00* (2006.01)
(52) U.S. Cl. ................. 398/59; 398/70; 398/75
(58) Field of Classification Search ............. 398/58–60, 398/66–73
See application file for complete search history.

(56) References Cited

U.S. PATENT DOCUMENTS

| | | | | | |
|---|---|---|---|---|---|
| 4,593,282 | A * | 6/1986 | Acampora et al. | ............ | 370/447 |
| 5,377,189 | A * | 12/1994 | Clark | ............ | 370/462 |
| 5,510,920 | A * | 4/1996 | Ota | ............ | 398/63 |
| 5,539,559 | A * | 7/1996 | Cisneros et al. | ............ | 398/51 |
| 6,456,410 | B1 * | 9/2002 | Condon et al. | ............ | 398/98 |
| 6,594,050 | B2 * | 7/2003 | Jannson et al. | ............ | 398/52 |
| 6,674,750 | B1 * | 1/2004 | Castellano | ............ | 370/354 |
| 6,687,463 | B1 * | 2/2004 | Hutchison et al. | ............ | 398/83 |
| 7,054,557 | B1 * | 5/2006 | Dasylva et al. | ............ | 398/48 |
| 7,366,368 | B2 * | 4/2008 | Morrow et al. | ............ | 385/15 |
| 8,086,805 | B2 * | 12/2011 | Holt | ............ | 711/150 |
| 8,102,851 | B1 * | 1/2012 | Mandin et al. | ............ | 370/390 |
| 2003/0012214 | A1 * | 1/2003 | Munter | ............ | 370/429 |
| 2008/0250221 | A1 * | 10/2008 | Holt | ............ | 711/200 |
| 2010/0272439 | A1 * | 10/2010 | Katayama et al. | ............ | 398/59 |
| 2012/0076495 | A1 * | 3/2012 | Kramer et al. | ............ | 398/58 |

FOREIGN PATENT DOCUMENTS

| | | |
|---|---|---|
| JP | 05-14283 A | 1/1993 |
| JP | 07-141312 | 6/1995 |
| JP | 07-264165 | 10/1995 |
| JP | 10-105528 | 4/1998 |

\* cited by examiner

*Primary Examiner* — Agustin Bello
(74) *Attorney, Agent, or Firm* — Vazken Alexanian

(57) ABSTRACT

A system and method for handling accesses by nodes connected to a ring network, using time division multiplexing (TDM). The system includes: nodes capable of receiving only an optical signal of a wavelength or positional space allocated to the node, and of transmitting optical signals of wavelengths allocated to other nodes; and a ring network that performs TDM transmission of optical signals. The ring network has slots for transmitting optical signals of individual wavelengths. Information indicates whether an optical signal to be transmitted exists in each of the slots. Nodes include means for updating the information indicating that the optical signal exists and determining means for updating the information and determining, on the basis of the information, whether to transmit the optical signal.

13 Claims, 8 Drawing Sheets

OPTICAL NETWORK SYSTEM AND MEMORY ACCESS METHOD

CROSS REFERENCE TO RELATED APPLICATION

This application claims priority under 35 U.S.C. 119 from Japanese Patent Application 2009-103809, filed Apr. 22, 2009, the entire contents of which are incorporated herein by reference.

BACKGROUND OF THE INVENTION

1. Field of the Invention

The present invention relates to a system and a memory access method in which one node connected to an optical network formed in the shape of a ring by the use of wavelength multiplexing and spatial multiplexing efficiently accesses a memory in another node by the use of time division multiplexed packets.

2. Description of Related Art

Non Uniform Memory Architecture (NUMA) is a memory architecture used for designing high-performance servers. NUMA is an architecture in which the costs of access to a memory shared by a plurality of CPUs are uneven in a manner that depends on the memory location and the CPU location. The reason why NUMA is mainstream is that migration of a centralized memory to distributed memories becomes mandatory as CPUs are parallelized so as to ensure the total bandwidth between CPUs and memories.

Here, a bandwidth means a transfer rate at which data are transferred, a centralized memory means a processing pattern in which many CPUs are connected to a single mass memory, and a distributed memory means a processing pattern in which distributed memories are provided in a plurality of CPUs. In a centralized memory, even when the number of CPUs is increased, an improvement in the performance is limited because data transfer between CPUs and a memory becomes a bottleneck. Thus, it is thought to be better to parallelize CPUs and adopt distributed memories to improve the performance.

A problem with NUMA is that there are variations in performance due to a difference in the access time between a plurality of memories (local memories) in a node including a CPU and the memories connected directly to the CPU and memories (remote memories) existing outside the node. The variations are one of the serious problems with performance in continuous progress of scale-up multiprocessing servers.

On the other hand, optical interconnect for interconnecting boards, chips, and the like by the use of an optical technique receives attention as a technique for eliminating restrictions on the transfer rate and transfer distance of data. For examples, refer to Japanese Unexamined Patent Application Publication No. 7-141312, Japanese Unexamined Patent Application Publication No. 7-264165 and Japanese Unexamined Patent Application Publication No. 10-105528. Due to the advance of this technique, a high-bandwidth interconnection between a CPU and a memory has been capable of being implemented even without necessarily disposing a memory physically close to a CPU. Thus, from the viewpoint of the bandwidth, a return to a centralized-memory system can be achieved by implementing access to a memory in a mass memory system by each CPU, using light, and this kind of implementation is being considered.

Recently, in the environment in which parallel processing is performed, a multi-core CPU including a plurality of processor cores encapsulated in a single processor package has been implemented so as to improve the performance by improving the overall throughput of a processor chip. In a sense, the trend toward multi-core goes against the trend toward NUMA in which problems have been solved by separating memories for individual cores.

In order to fully utilize the capability of multiple cores, a memory connected to the multiple cores, although partially, is constructed as a centralized memory for each chip, and thus a large bandwidth and memory capacity per chip are required. In the process of scale-up in which nodes each of which includes multiple cores are combined, not only the total bandwidth but also a decrease in the influence of a difference in performance between a local memory and a remote memory due to memory affinity setting by an OS and hypervisor are important in achieving a stable system performance.

Elimination of a difference in the access time between a local memory and a remote memory requires not only improving the total bandwidth but also efficiently performing random access from multiple CPUs to a memory via electrical multi-stage switches. From this standpoint, in a communication system in which wavelength division multiplexing (WDM) is adopted, not only the bandwidth expansion but also a technique for constructing an optical network using $\lambda$-switching have progressed. In this technique, since no electrical switch is used, a sender and a receiver can directly transfer high-bandwidth data, using a specific wavelength. WDM is a method for using an optical fiber in an overlapping manner by simultaneously using a plurality of optical signals having different wavelengths.

FIG. 1 shows a configuration example of Uniform Memory Architecture (UMA) in which the WDM technique is used. Four CPUs 10 are interconnected via an optical fiber 11 so as to form a ring. Each of the CPUs includes a plurality of processor cores. A plurality of memories 13 are connected to the CPU 10 via a memory bus 12.

In this configuration example, a specific wavelength is allocated to the memories 13 connected to the CPU 10 to access the memories 13, and the memories 13 are accessed, using light having the wavelength. In WDM, since the optical fiber 11 can be used in an overlapping manner by simultaneously using a plurality of optical signals having different wavelengths, a difference in the access time between a local memory and a remote memory associated with extra switching and hopping can be eliminated. Thus, the performance of future scale-up server systems can be significantly improved.

Data transfer between CPUs is performed using the optical fiber 11, and data transfer from a CPU to a memory is performed using the memory bus, as shown in FIG. 1. When the CPUs 10 have accesses at different wavelengths, no access contention occurs. However, when the CPUs 10 have accesses at a specific wavelength at the same time, access contention occurs. Thus, when a practical system is designed, in view of occurrence of accesses to the memories 13 at a certain location from a large number of CPUs 10, the key is how to efficiently handle access contention.

As compared with a network in which an I/O device such as an input and output interface is used, in a CPU-memory network, it is difficult to install, between a CPU and a memory, a mechanism ensuring the reliability between the CPU and the memory from end-to-end. Thus, even in a case where the probability of occurrence of packet loss due to access contention is low, once packet loss occurs, this may have a fatal effect on the operation of the system.

The unexamined Japanese patent applications referred to above disclose techniques for performing transmission by wavelength multiplexing, using an optical fiber, so as to reduce the number of wires but do not disclose any method for efficiently eliminating the aforementioned access contention, using an optical network. A practical method for this has not been proposed. One of the main reasons for this is that, due to restrictions on the switching time of a switch element, although an optical network is suitable for a high-bandwidth data plane based on a circuit switch that does not require too frequent switching, the applicable scope of an optical network is limited in, for example, packet processing including a control plane that involves frequent switching and requires complex processing.

SUMMARY OF THE INVENTION

In accordance with one aspect of the present invention, an optical network system includes: a plurality of nodes to which different wavelengths or positional spaces of a transmission line are allocated, each of the nodes being capable of receiving only an optical signal of the allocated wavelength or the allocated positional space and transmitting, to the other nodes, optical signals of the wavelengths or the positional spaces allocated to the other nodes; and a ring network formed in the shape of a ring that performs time division multiplexing transmission of a plurality of optical signals from the plurality of nodes. In the ring network, a plurality of time-division slots are formed for transmitting optical signals of the wavelengths or the positional spaces allocated to the individual nodes, the plurality of time-division slots including information indicating whether an optical signal to be transmitted exists in the time-division slot. Each node includes (a) updating means for updating, without checking the information included in the time-division slot corresponding to a node that receives an optical signal from the node, the information with information indicating that the optical signal exists, and (b) determining means for (i) operating in the same clock cycle as that in which the updating means updates the information, (ii) reading the information having not been updated, and (iii) determining, on the basis of the read information, whether to transmit the optical signal in parallel with updating of the information by the updating means.

In accordance with another aspect of the present invention, a memory access method is performed between a plurality of nodes via a ring network formed in the shape of a ring, different wavelengths or positional spaces of a transmission line being allocated the plurality of nodes, each of the nodes receiving only an optical signal of the allocated wavelength or the allocated positional space to allow access to a memory provided in the node and transmitting optical signals of the wavelengths or the positional spaces allocated to the other nodes to memories provided in the other nodes, the ring network performing time division multiplexing transmission of a plurality of optical signals from the plurality of nodes. The method includes the steps of: indicating whether an optical signal to be transmitted exists in the time-division slot, the indication occurring in the ring network in which time-division slots for transmitting optical signals of the wavelengths or the positional spaces allocated to the individual nodes are formed, without checking information included in the time-division slot corresponding to a node that receives an optical signal; updating the information included in the time-division slot with information indicating that the optical signal exists; and in the same clock cycle as that in which the updating step updates the information, reading the information having not been updated and determining, on the basis of the read information, whether to transmit the optical signal in parallel with the updating step.

In accordance with a further aspect of the invention, a computer program causes a computer to perform the steps of the above method.

DETAILED DESCRIPTION OF THE PREFERRED EMBODIMENTS

Figure 1:
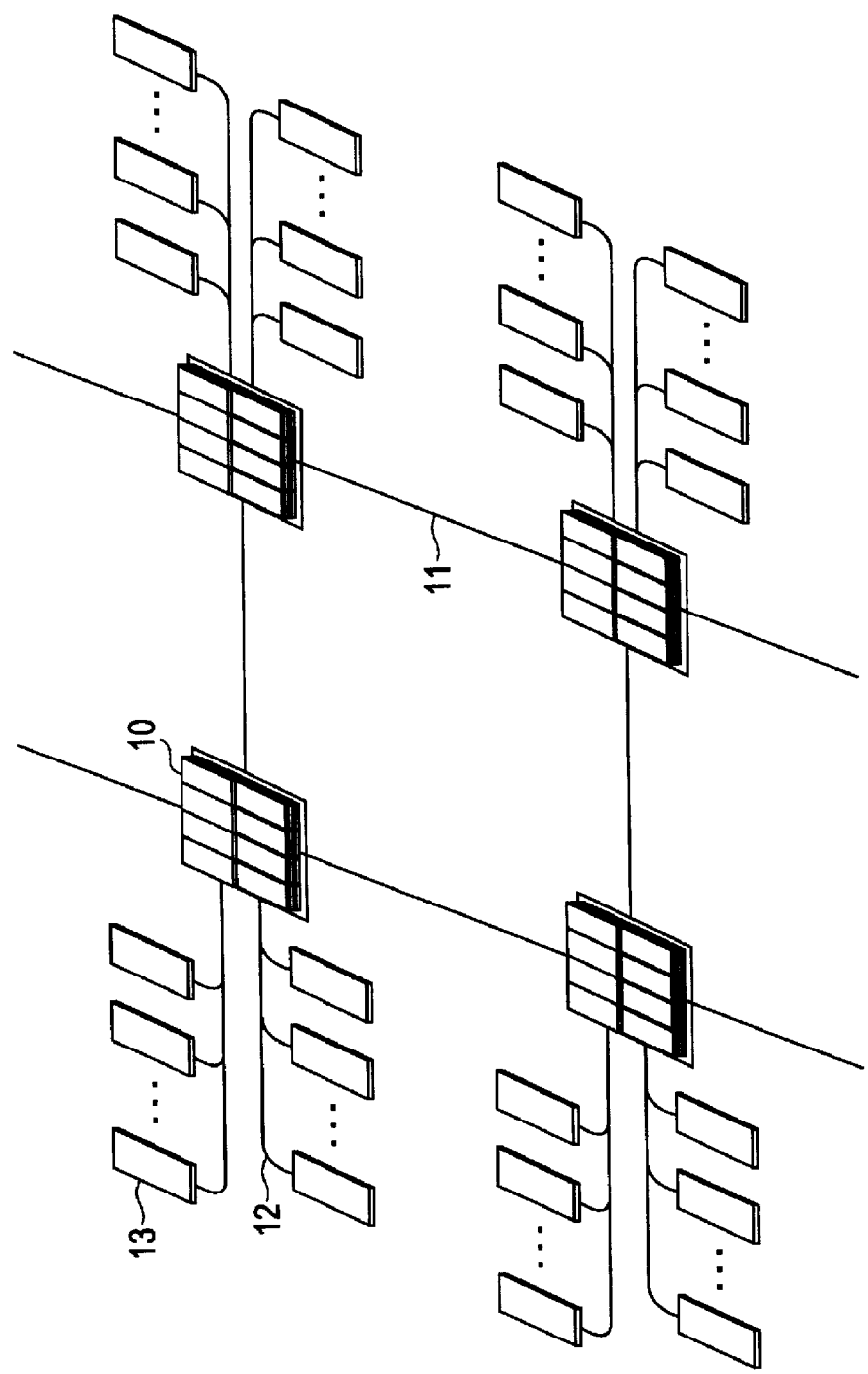
FIG. 1 is a diagram showing a configuration example of UMA in which WDM is used.

An object of the present invention is to provide an optical network system and a method for efficiently handling accesses to a shared memory by nodes connected to an optical network formed in the shape of a ring in which optical signals are transmitted in one direction, using time division multiplexing. In the system, the wavelengths or positional spaces of a transmission line of optical signals to be received are allocated to the individual nodes. The system performs multiplexing of the optical signals at the wavelengths or in the positional spaces. Here, time division multiplexing means a multiplexing method for sharing a line by temporally arranging optical signals of different wavelengths or positional spaces.

In view of the aforementioned problems, with the present contention in an optical network formed in the shape of a ring can be eliminated without packet drop and the priorities of transmitting nodes can be controlled by providing a contention bit identified by a wavelength or a positional space corresponding to a receiving node number in each of the slots (time slots) obtained by dividing time to use a shard line by time division multiplexing into a predetermined length and allowing the individual nodes to overwrite the contention bit.

A system that can be provided in the present invention is an optical network including a plurality of nodes to which different wavelengths or positional spaces of a transmission line are allocated, each of the nodes receiving only an optical signal of the allocated wavelength or the allocated positional space to allow access to a memory provided in the node and transmitting optical signals of the wavelengths or the positional spaces allocated to the other nodes to access memories provided in the other nodes, and a ring network formed in the shape of a ring, the ring network being capable of performing time division multiplexing transmission of a plurality of optical signals from the plurality of nodes only in one direction.

The ring network is configured so that time-division slots for transmitting, as optical packets, optical signals of the wavelengths or the positional spaces allocated to the individual nodes are formed, and each of the time-division slots includes information indicating whether an optical packet to be transmitted exists in the time-division slot. The information is a contention bit existing at the head of the slot and including at least one bit. When an optical packet exists in the slot, the contention bit is turned on.

The node includes updating means for updating, without checking the information included in the time-division slot corresponding to a node that receives an optical packet from the node, the information with information indicating that the optical packet exists, and determining means for operating in the same clock cycle as that in which the updating means updates the information, reading the information having not been updated, and determining, on the basis of the read information, whether to transmit the optical packet in parallel with updating of the information by the updating means. That is, without checking whether a contention bit has been turned on in a slot, the updating means performs updating by turning on or overwriting the contention bit.

The determining means operates in the same clock cycle as that in which the updating means writes a contention bit as updating of information. In the clock cycle, before the updating means writes the contention bit, the determining means reads the value of the contention bit and determines, in parallel with updating of the information by the updating means, whether an optical packet can be transmitted. When the value indicates that the contention bit has been already turned on, since another optical packet already exists in a corresponding slot, the determining means can determine that the optical packet cannot be transmitted. When the value does not indicate that the contention bit has been already turned on, since no optical packet exists in the slot, the determining means can determine that the optical packet can be transmitted.

In this manner, in optical communication, even in a case where a bit that has been already turned on is overwritten, when the settings in a receiving node are appropriate, a corresponding time-division slot is occupied by a specific node. Thus, another node can determine that transmission cannot be performed to suspend the transmission by accumulating a corresponding optical packet in a transmit queue until the next time-division slot.

An optical packet may include node identification information for identifying the node having transmitted the optical packet. The node may further include controlling means for, when the number of times an optical packet including the same node identification information has been received exceeds a predetermined number within predetermined time, transmitting, to a first node identified by the node identification information, a hold signal for suspending transmission of an optical packet of the wavelength or the positional space allocated to the first node.

Moreover, the node may further include suspending means for receiving a hold signal from the controlling means and suspending transmission of an optical packet of the wavelength or the positional space specified by the hold signal. In this case, a hold signal is preferably an optical signal of a wavelength or a positional space that is not allocated to the plurality of nodes.

In addition to the aforementioned optical network system, the present invention may provide a memory access method performed by the system and may provide a computer-readable program for implementing the method and a recording medium in which the program is recorded.

By providing the system, the method, and the program, it is determined, without checking whether a contention bit has been turned on, whether an optical packet is transmitted. Thus, a step of checking a contention bit is eliminated, and the processing can be performed efficiently. Moreover, only when it is determined that an optical packet can be transmitted, the optical packet is transmitted. Thus, packet drop does not occur. Moreover, a high bandwidth achieved by an optical network can be fully used without overhead due to access contention. Thus, the performance of a symmetrical multiprocessor (SMP) including a plurality of nodes can be improved to the extent that the communication bandwidth between nodes is fully used.

The present invention will now be described with respect to a specific embodiment shown in the drawings. However, the present invention is not limited to the embodiment described below.

Figure 2:
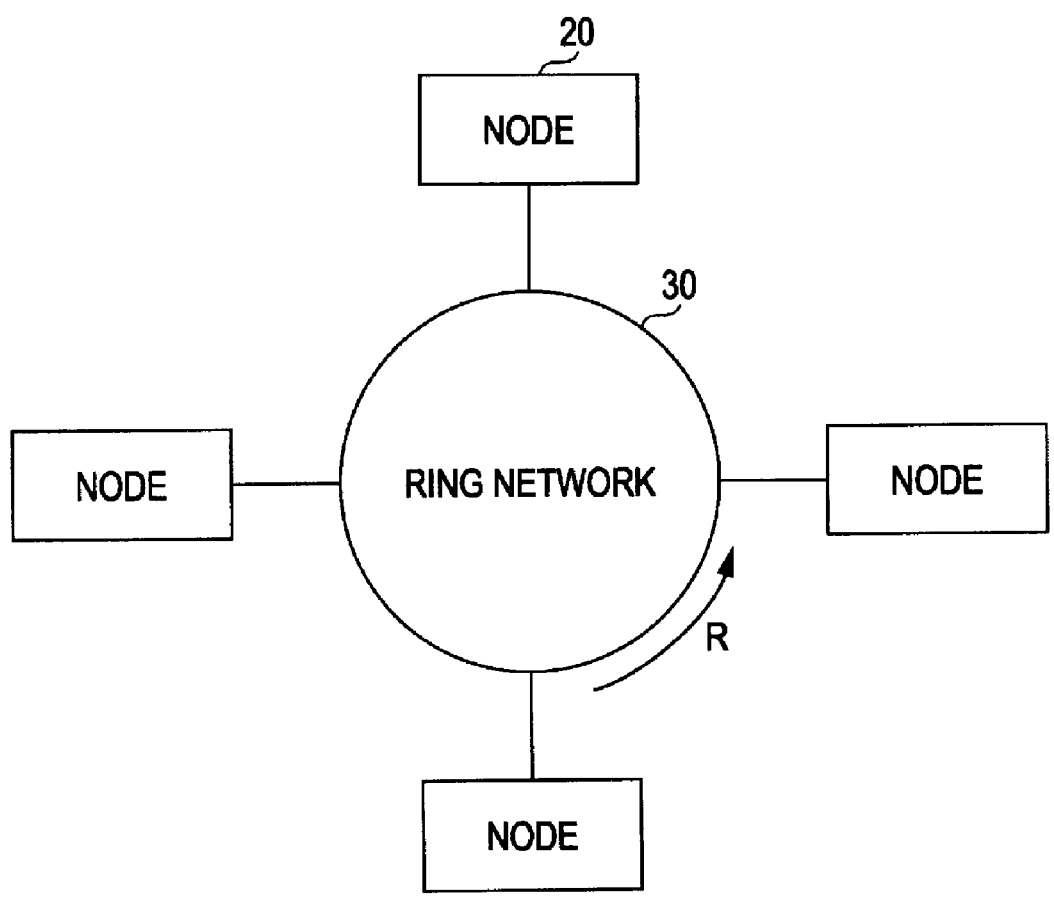
FIG. 2 is a diagram showing a configuration example of an optical network system.

FIG. 2 is a diagram showing a configuration example of an optical network system according to the present invention. The system includes a plurality of nodes 20 and a ring network 30 formed in the shape of a ring by interconnecting the nodes 20 using an optical fiber cable. In the ring network 30, since optical signals can be set to be transmitted in only one way, as indicated by an arrow R, no signal collision occurs. This is possible because light has a high rectilinearity. The cable may be a single cable. However, when a failure occurs, the whole system is stopped. Thus, for example, a double ring structure may be adopted by connecting the nodes 20 to two ring optical fiber cables. The cable may be formed of a single optical fiber or a plurality of optical fibers.

The detailed configuration of each of the nodes 20 is described below. The node 20 can transmit an optical packet that is a transmission unit of information to another node via the ring network 30 and receive an optical packet from another node. An optical packet includes, in addition to information, the respective addresses of a source and a destination, the type of the packet, a number that is the identification information of the packet, and the like.

Different specific wavelengths or different positional spaces of a transmission line are allocated to the individual nodes 20. Each of the nodes 20 receives only optical signals of the corresponding specific wavelength or the corresponding positional space to allow access to a memory provided in the node 20 and can access a memory provided in another node by transmitting optical signals of the corresponding wavelength or the corresponding positional space allocated to the other node. Thus, a memory provided in the node 20 is a shared memory accessible by any node.

A shared memory can be accessed, using time division multiplexing for temporally arranging optical signals of a plurality of different wavelengths or positional spaces and transmitting the arranged optical signals. Specifically, a plurality of transmission lines are virtually implemented by partitioning the occupancy time of a line shown in FIG. 3 into predetermined time slots 40 and allocating the slots 40 to a plurality of channels, i.e., wavelengths or positional spaces, to implement simultaneous access to a shared memory provided in each of the slots 40.

For example, when an optical packet 41 is transmitted to one of the nodes 20, the transmission is performed, using a wavelength or a positional space allocated to the node 20, in one of the slots 40 to which the wavelength or the positional space is allocated. In the slot 40, contention between the optical packets 41 transmitted from two or more nodes may occur. Thus, a contention bit 42 is provided in the slot 40, and contention is avoided by transmitting only the optical packet 41 from a node.

The slots 40 are divided in appropriate time units in view of the length of an optical packet, and a contention field (not shown) with a length of one or more bits is provided at the head of each of the slots 40. The optical packet 41 follows the contention field. FIG. 3(a) shows the individual slots 40, in which optical packets to be received by individual four nodes are placed, and a contention field is provided in the slot 40 with a direction indicated by an arrow being the head. The direction is the time direction. In the slot 40, in which the optical packet 41 is placed, the contention bit 42 is turned on in the contention field.

Contention can be eliminated by turning on the contention bit 42 in a contention field with a length of at least one bit provided in the slot 40. The contention bit 42 can be turned on by changing the value of the contention bit 42 from zero to one. For example, assuming that the threshold of light intensity is 0.5, when the value is equal to or more than 0.5, it can be determined that a bit is turned on.

Figure 3:
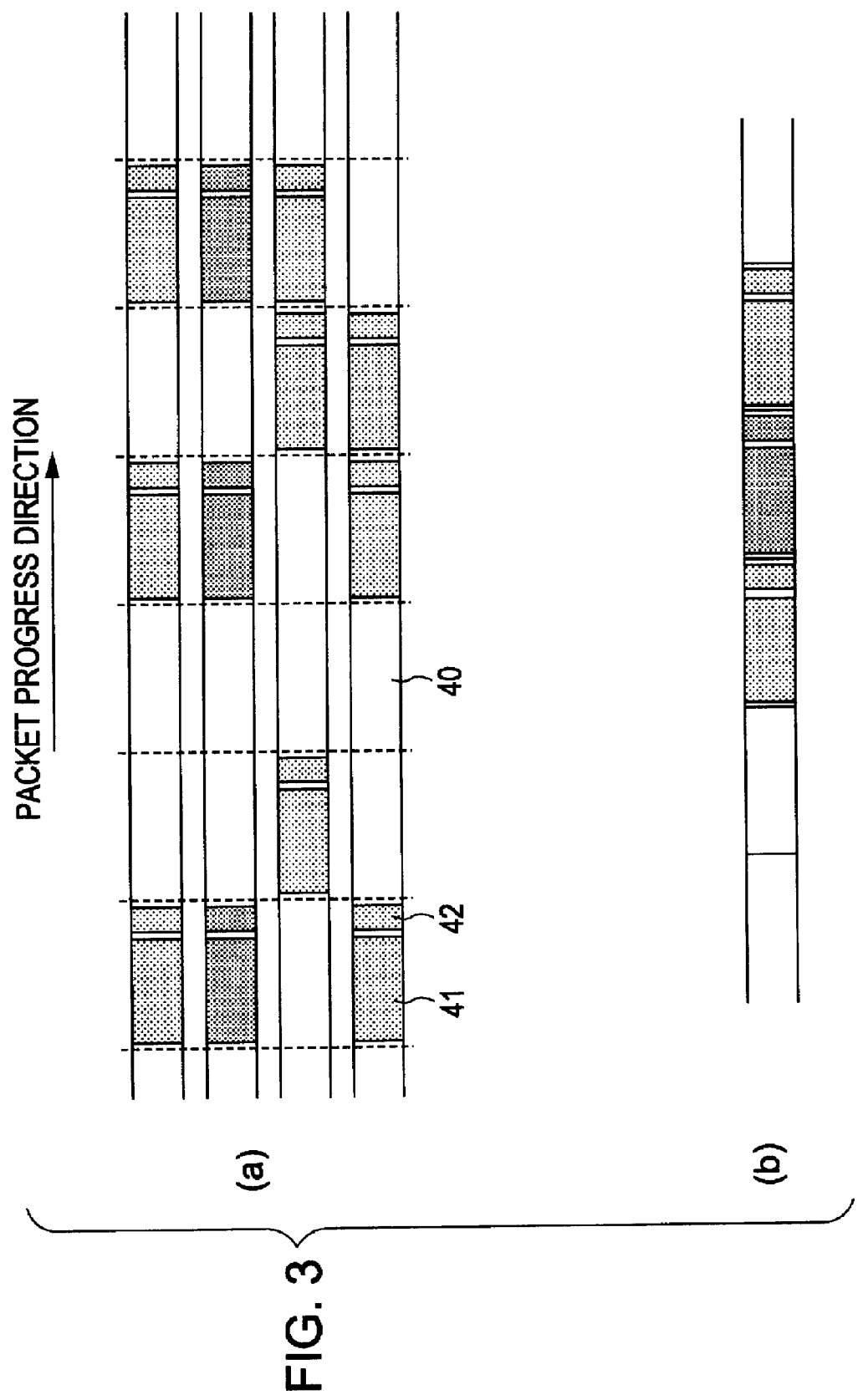
FIG. 3 is a diagram exemplifying time-division slots.

In the ring network 30, the slots 40 to be sent to the individual nodes 20 are concatenated in sequence, as shown in FIG. 3(*b*).

In an optical network system in which WDM is used, different specific wavelengths are allocated to individual nodes, and optical packets can be sent or received at the wavelengths. When space division multiplexing (SDM) is used, instead of a wavelength, a positional space of a transmission line for transmitting an optical signal having a specific wavelength is allocated to each node, and an optical packet is sent in the positional space. The present invention is described below, assuming WDM.

A wavelength allocated to each of the nodes 20 is the defined receive wavelength. The transmit wavelength can be freely changed to a wavelength allocated to a destination node to perform transmission. Thus, a wavelength-tunable transmitter module can be provided, and the transmitter module can perform transmission by integrating tunable laser beams or laser beams having different wavelengths and bringing the laser beams together to a single optical fiber via a multiplexer. The nodes 20 can be connected to the ring network 30, using an Add-Drop multiplexer. This multiplexer is a device that adds or drops a lower-bandwidth line to or from a ring optical network.

Tunable laser beams or laser beams having different wavelengths can be generated by direct modulation for performing modulation by inputting a modulating signal to a semiconductor laser and directly turning on and off the semiconductor laser or external modulation for performing modulation by changing the phase, amplitude, plane of polarization, and the like by inputting a carrier wave and a modulating signal to a modulator.

For example, an optical modulator that performs electro-optical conversion or an optical switch element that blocks a specific wavelength can be used to receive only an optical signal having a specific wavelength.

The length of a packet when a CPU provided in the node 20 performs access, using an access protocol, is regular as compared with the length of a packet when access is performed via an I/O device. Even the longest packet is a packet for burst transfer to be used to Fill (reading the content of a memory into a cache) a cache line. Thus, it is relatively easy to construct an optical network system that performs time division multiplexing transmission. In time division multiplexing transmission, the line time is partitioned into slots partitioned into a constant short length, and packets are transmitted substantially at the same time after being placed in the individual slots.

Figure 4:
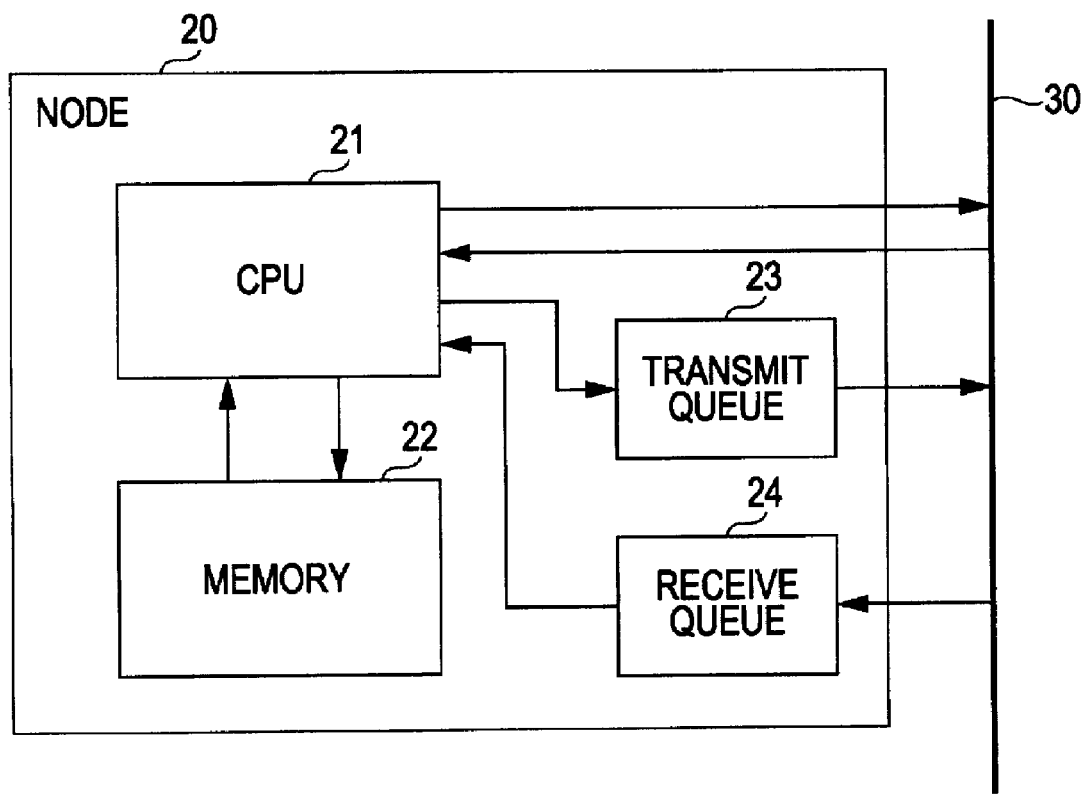
FIG. 4 is a diagram showing a configuration example of a node connected to an optical network.

Referring to FIG. 4, the details of the node 20 will now be described in detail. The node 20 includes a CPU 21 including a plurality of CPU cores, a memory 22 to be accessed by the CPU 21 and another node, a transmit queue 23 temporarily storing an optical packet to be sent to another node, and a receive queue 24 temporarily storing a received optical packet.

The CPU 21 generates and transmits an optical packet and processes a received optical packet. The CPU 21 can perform these operations, using dedicated additional hardware. Moreover, in the case of a sufficiently high-speed CPU, the operations can be performed by reading a program from the memory 22 and executing the program. The CPU 21 is a multi-core CPU including a plurality of CPU cores. The individual CPU cores can independently perform separate operations in parallel. Thus, fast processing can be achieved.

The memory 22 is a shared memory accessible by each of the CPU cores and each of the plurality of CPU cores provided in another node. The memory 22 accepts access by an optical packet from a node in a time-division slot and allows data and the like to be stored and read. Thus, the memory 22 stores, in addition to the aforementioned program, various types of data and parameters and the like.

When an optical packet generated by the CPU 21 cannot be transmitted to a corresponding node, the transmit queue 23 temporarily stores the optical packet and suspends the transmission until the optical packet can be transmitted. In the transmit queue 23, packets are retrieved in the order in which the packets were put in the queue and transmitted to corresponding nodes in corresponding slots.

While the memory is accessed by another node and an optical packet is being processed, the receive queue 24 temporarily stores other optical packets in the order in which the other packets were accepted. In the receive queue 24, packets are retrieved in the order in which the packets were put in the queue, and access to the memory 22 is allowed.

The transmit queue 23 and the receive queue 24 may be FIFO queues in which first in, first out. Additionally, the node 20 may include a plurality of devices such as I/O devices. The CPU 21 is connected to the memory 22, I/O devices, and the like via an address bus, a data bus, and a control bus and can communicate with these devices by controlling these buses. Addresses are assigned to the devices, and the CPU 21 can perform communication on the basis of the addresses.

Figure 5:
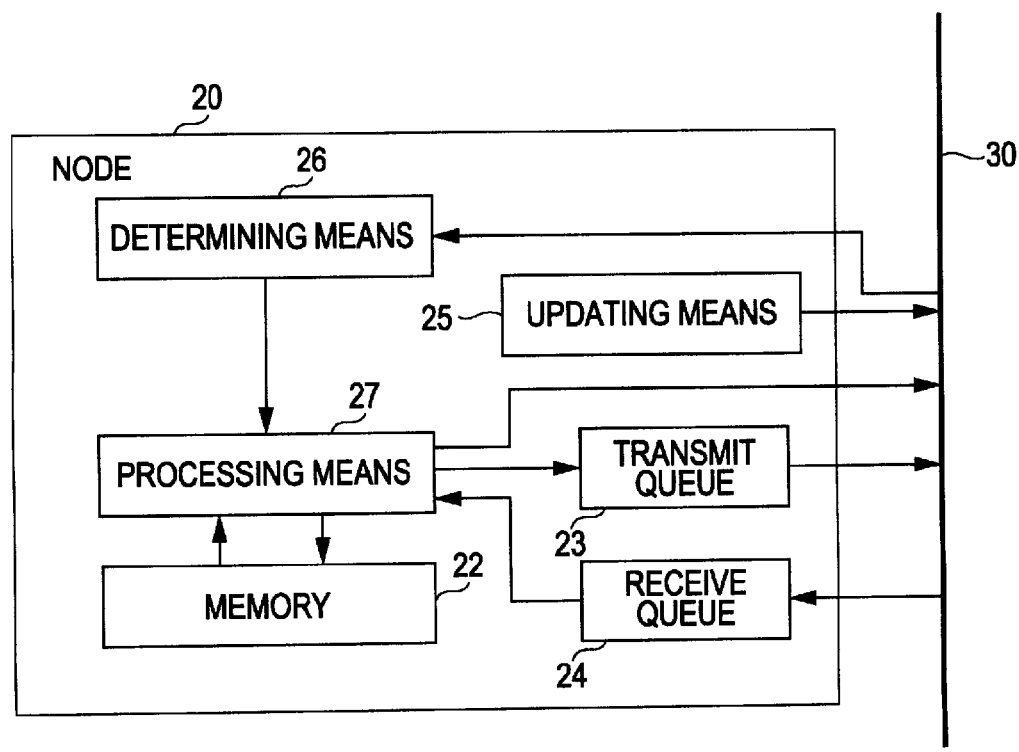
FIG. 5 is a diagram exemplifying a detailed configuration of a node.

The CPU 21 can function as individual means shown in FIG. 5 by using dedicated hardware or reading the program from the memory 22 and executing the program. In the present invention, the CPU 21 can function as updating means 25, determining means 26, and processing means 27.

Without checking a contention bit included in a slot corresponding to a node receiving an optical packet, the updating means 25 turns on the contention bit when the contention bit has not been turned on and overwrites the contention bit when the contention bit has been already turned on.

When a first node needs to transmit an optical packet, regardless of whether a second node existing upstream to the first node has already turned on a contention bit in a contention field, the updating means 25 provided in the first node performs a writing operation on the field to turn on the contention bit. Here, an upstream node means, assuming that a third node that receives an optical packet is most downstream, a node existing at a position on a course going upstream from the first node in a direction opposite the transmission direction of the optical packet.

A case where a bit is turned on with an electrical signal will now be described. A predetermined voltage is applied, and a bit is turned on when the voltage is reached. If an overwriting operation on the bit is allowed, this indicates that no competing packet exists, and thus it is determined that an optical packet can be transmitted. However, actually, the packet competes with an existing packet, resulting in a dropped packet. Thus, in general, when a bit is attempted to be turned on, it needs to be checked in advance whether the bit has been already turned on. As a result of the check, when the bit has not been turned on, the bit can be turned on. A bit can be turned on by applying a voltage by turning on a switch. When a bit is turned on with an electrical signal, the processing is delayed by one or more clock cycles for each node due to the necessity for the pre-check. Here, a clock cycle means the number of clocks necessary to complete an instruction.

When optical signals in the present invention are used, since determination of the presence or absence of a competing packet and updating of a contention bit can be performed in the same clock cycle, as described below, a bit can be turned on without checking whether the bit has been already turned on. Thus, any special switch is not necessary, and control of the switch is not necessary accordingly. Moreover, since a step of checking a bit is not necessary, the processing efficiency can be improved.

Thus, the determining means 26 is configured to operate in the same clock cycle as that in which the updating means 25 writes a contention bit. In the clock cycle, before the updating means 25 writes the contention bit, the determining means 26 reads the value of the contention bit having not been updated and determines whether to transmit an optical packet. In this case, this determination can be performed in parallel with a writing operation by the updating means 25.

When a bit is overwritten with an electrical signal, since control over the propagation direction of signals is not necessarily sufficient, it is difficult to perform an operation by the updating means 25 and an operations by the determining means 26 in the same clock cycle.

In contrast, in the case of optical signals, since light has a high rectilinearity, optical signals can be relatively easily set to propagate in one direction in a ring. Thus, even when a signal output from the updating means 25 is disposed just after a signal output from the determining means 26 in a ring, and processing of the signals is performed in the same clock cycle, no problem occurs. This is because reading of the value of a contention bit by the determining means 26 and writing of a contention bit by the updating means 25 can be reliably performed in this order.

In this manner, in the case of optical signals, even when a contention bit has been already turned on by a preceding node, detecting that a slot is already occupied by a specific optical packet and indicating the intention to occupy the slot from this time can be performed in the same clock cycle. Thus, without wasting any clock cycle to determine that an optical packet cannot be transmitted, control of contention can be performed, and transmission of the optical packet can be suspended by accumulating the optical packet in the transmit queue 23 until the next slot.

Subsequently, in the same clock cycle as that in which a contention bit of the next slot is written, before a write operation is performed on a corresponding contention field, the value of the contention bit having not been updated is read, and it is determined whether the optical packet can be transmitted. When the optical packet can be transmitted, the optical packet is transmitted following the contention bit. When the optical packet cannot be transmitted, the optical packet is left in the transmit queue, and the transmission of the optical packet is suspended until the further next slot.

Upon receiving the determination result from the determining means 26, the processing means 27 transmits the optical packet or sends the optical packet to the transmit queue 23 in a manner that depends on the determination result. Moreover, the processing means 27 retrieves and processes optical packets received from other nodes and stored in the receive queue 24 in sequence. When the corresponding optical packet is a request for access to data stored in the memory 22, after retrieving and decoding the optical packet, the processing means 27 retrieves the data stored in the memory 22, generates an optical packet including the data, and transmits the optical packet to a requesting node.

Figure 6:
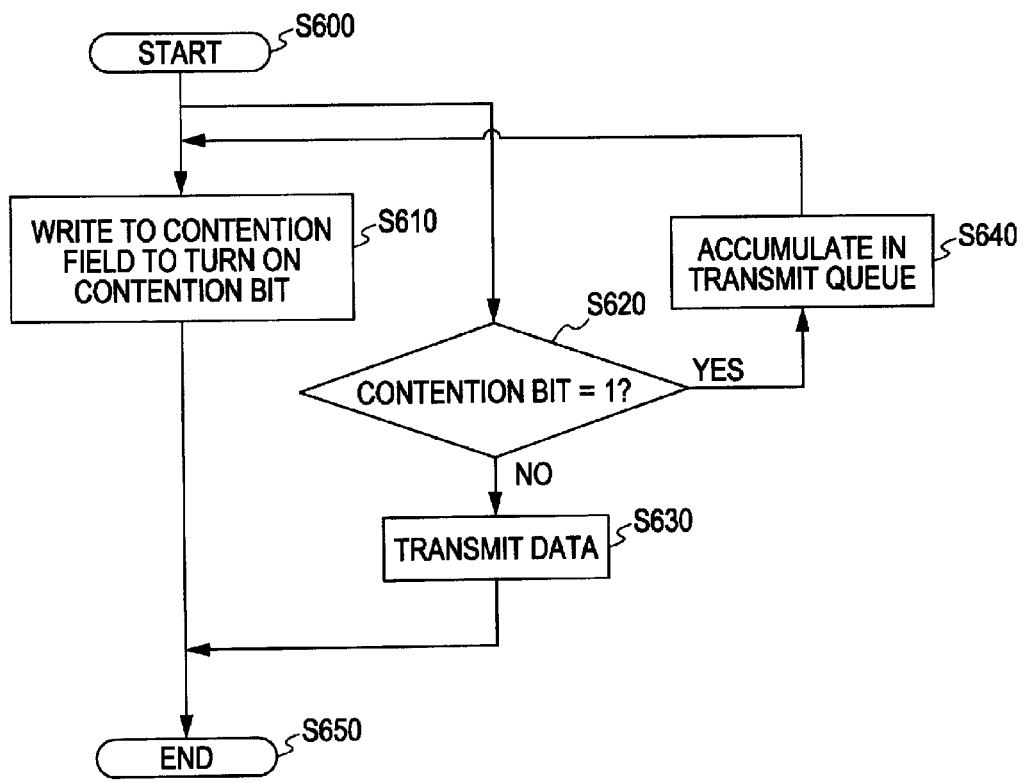
FIG. 6 is a flowchart exemplifying the flow of memory access.

The flow of memory access performed in an optical network system will now be described with reference to a flowchart shown in FIG. 6. When a certain node accesses a memory provided in a specific node, the process is performed. The process starts from step 600. In step 610, the updating means 25 performs a writing operation on a contention field provided in a slot corresponding to a wavelength allocated to the specific node to turn on a contention bit in the contention field without checking whether the contention bit has been turned on. After the bit is turned on, the process proceeds to step 650, and an operation by the updating means 25 is terminated.

In parallel with step 610, in step 620, the determining means 26 determines, from the status of the contention bit, whether an optical packet can be transmitted. That is, the determining means 26 determines whether the contention bit in the contention field has been already turned on to be set to one. In this case, the status of the contention bit can be detected by reading the value of the contention bit before the updating means 25 performs a writing operation in step 610.

When the contention bit is not set to one, since the contention bit is not overwritten, the process proceeds to step 630 where it is determined that the optical packet can be transmitted, and the optical packet is transmitted. Then, in step 650, the process is terminated.

On the other hand, when the contention bit is set to one, since another optical packet already exists in the slot, it is determined that the optical packet cannot be transmitted, and the process proceeds to step 640 where the optical packet is put in a transmit queue. Then, the process returns to step 610 where a writing operation is performed on a contention field provided in the next slot corresponding to the wavelength allocated to the specific node to turn on a contention bit in the contention field without checking whether the contention bit has been turned on.

The process can be continued until the optical packet is transmitted. Alternatively, when the optical packet cannot be transmitted within a predetermined time or number of times, the process can be stopped, and the optical packet can be discarded.

Figure 7:
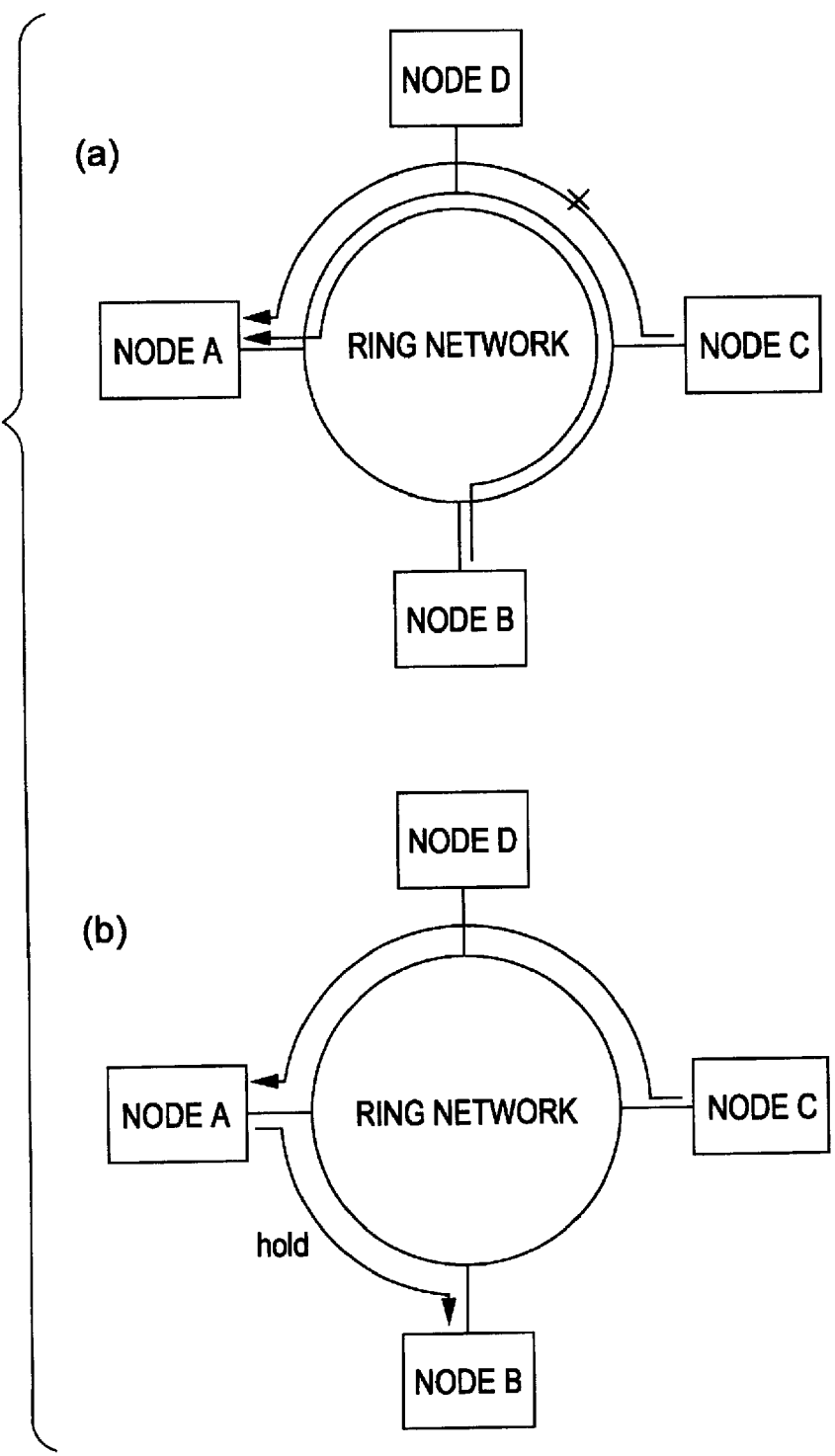
FIG. 7 is a diagram exemplifying the scheduling of memory access.

FIG. 7 is a diagram exemplifying the scheduling of memory access. In an optical network system, assuming that a node that receives an optical packet is the most downstream node, priorities are assigned in order starting from the most upstream node based on the transmission direction of the optical packet. For example, assuming that a node A is a node receiving an optical packet, and the optical packet is transmitted in a counterclockwise direction, priorities are assigned in order of nodes B, C, and D, as shown in FIG. 7(a).

When priorities are determined in this manner, the priority of the node B is always highest, and the priority of the node D is always lowest. In this status, when the node B continues transmitting optical packets to the node A, during the transmission, the nodes C and D cannot transmit optical packets to the node A. In this status, an imbalance in which accesses from the specific node B are concentrated, and accesses from the downstream node C are blocked occurs.

Each of the nodes B, C, and D cannot determine the respective statuses of the other nodes. On the other hand, the node A receiving packets from these nodes can determine from which node a packet is currently being transmitted. Thus, when accesses from the specific node B are concentrated, the node A, which is a receiving node, can indicate to the node B to suspend transmission of optical packets by sending the node B a hold signal for suspending accesses from the node B, as shown in FIG. 7(b). The CPU can be caused to function as controlling means, and the instruction can be sent to the node B by the controlling means.

The node B having received the hold signal causes the CPU to function as suspending means and puts, using the suspending means, optical packets to be transmitted in the transmit queue in the node B to suspend the transmission until receiving a signal for canceling the suspension. These signals are preferably transmitted at an out-of-band wavelength other than specific wavelengths allocated to the individual nodes A, B, C, and D. This is because, when the same wavelength is used, a deadlock is prone to occur.

Meanwhile, the downstream node C can access a memory provided in the node A by transmitting a packet to the node A. When the suspension in the upstream node B is cancelled, a higher priority is again given to the upstream node B, and thus access to the node A by the downstream node C is blocked.

In this manner, the overall processing efficiency can be improved by equally allocating accesses from individual nodes. In this case, suspension can be cancelled by the node A transmitting a signal indicating cancellation of the suspension to the node B when the node C has received a predetermined number of optical packets. The signal is also preferably transmitted at an out-of-band wavelength. The predetermined number may be any number. For example, upon receiving ten packets from the node B, the node A may cause transmission from the node B to be suspended, and then upon receiving ten packets from the node C, the node A may cause the suspension in the node B to be cancelled. In this case, when optical packets to be transmitted from the node D to the node A are outstanding, after the nodes B and C transmit a certain number of optical packets in the aforementioned manner, the node D can transmit the optical packets by causing the transmission from the nodes B and C to be suspended.

Figure 8:
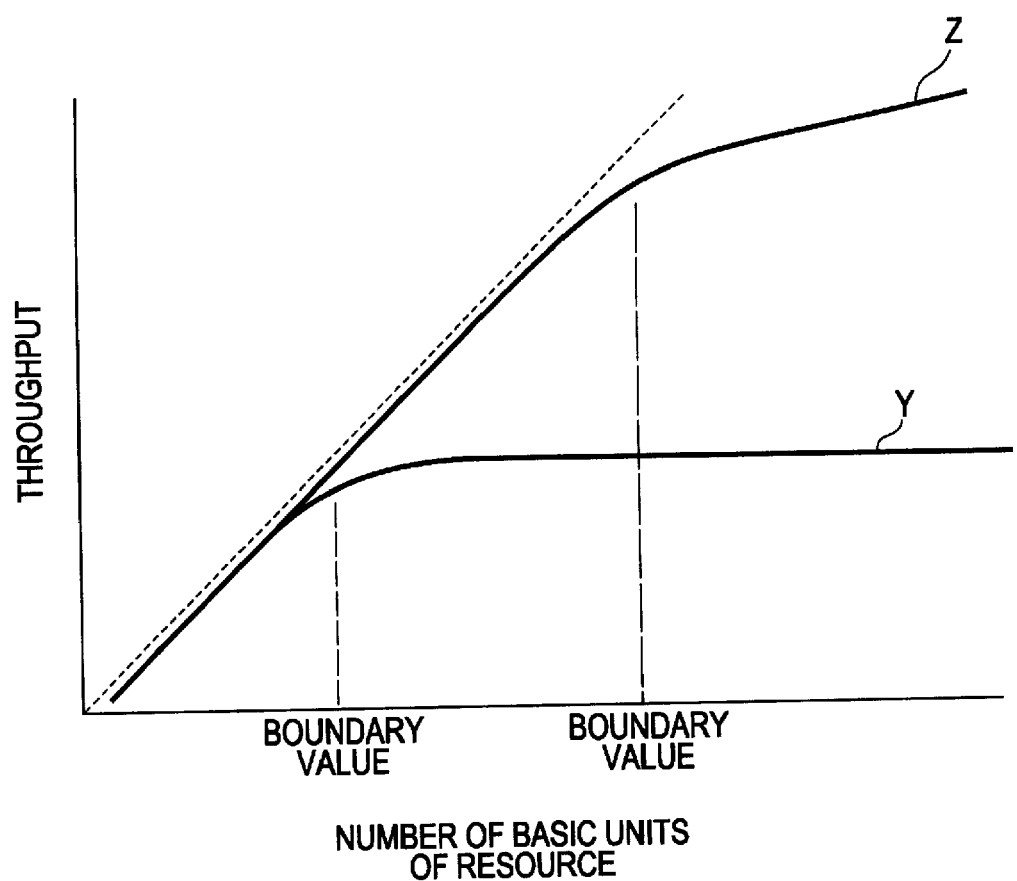
FIG. 8 is a diagram exemplifying the relationship between resources and peak throughput at the time of memory access.

FIG. 8 shows the results of a simulation for examining the degree of improvement over a known method in the processing efficiency achieved by using the aforementioned memory access method according to the present invention. In this case, the results of an examination by a simulation greatly vary with a selected problem. Thus, here, theoretical consideration is made.

In general, in the processing in a computer, it is assumed that a constant relationship exists between the throughput of a CPU and the memory size. The relationship is typified by Amdahl's law for determining the degree of improvement in the performance that can be expected as a whole when a part of a system is improved.

In this case, for the sake of simplification, it can be thought that, assuming that a single CPU core and memory size commensurate with the CPU core are a basic unit of resource, each node that is an MCM unit includes N CPU cores and memory that is N times as much as a basic unit of memory commensurate with the N CPU cores. Here, MCM means a plurality of bare chips that are mounted directly on a board and are bundled as a single functional module.

It can be assumed that parallelization in software goes well when a working set (a memory area that is not swapped, out of memory used by software, where an OS swaps data that is not frequently used from a physical memory to an HDD) for the processing that needs calculation is N or less times as much as the basic unit. As long as basic units used by the working set are N or less times as much as the basic unit, the throughput is not highly sensitive to the effective communication bandwidth between nodes and is scaled in accordance with the number of basic units of resource that are used along a broken line.

However, when the working set exceeds the basic unit shown as a boundary value, the throughput greatly depends on the bandwidth between bands between nodes and is not scaled in accordance with the number of basic units of resource that are used, sharply deviating from the broken line, as indicated by a curve Y.

On the other hand, when the memory access method according to the present invention is used, the effective communication bandwidth between nodes can be significantly improved without access contention. Thus, even in a case where the basic units of the working set are more than N times as much as the basic unit, when parallelization in software goes well, the throughput can be scaled in accordance with the number of basic units of resource that are used along the broken line, as indicated by a curve Z.

This shows that a high bandwidth achieved by an optical network can be fully used without overhead due to access contention, and the performance of an SMP including a plurality of nodes can be improved to the extent that the communication bandwidth between nodes is fully used.

While the optical network system and memory access method according to the present invention have been described in detail with reference to the drawings, other embodiments, additions, changes, and deletions can be made within a range that can be reached by those skilled in the art and fall within the scope of the present invention as long as the operations and effects of the present invention are achieved.

What is claimed is:

1. An improved optical network system having (i) a plurality of nodes to which different wavelengths or positional spaces of a transmission line are allocated, each of the nodes being capable of receiving only an optical signal of the allocated wavelength or the allocated positional space and transmitting, to the other nodes, optical signals of the wavelengths or the positional spaces allocated to the other nodes and (ii) a ring network formed in the shape of a ring that performs time division multiplexing transmission of a plurality of optical signals from the plurality of nodes, wherein the improvement comprises:

a plurality of time-division slots formed in the ring network for transmitting optical signals of the wavelengths or the positional spaces allocated to the individual nodes, said plurality of time-division slots including information indicating whether an optical signal to be transmitted exists in the time-division slot; and updating means in each of said plurality of nodes for updating without checking the information included in the time-division slot corresponding to a node that receives an optical signal from the node, said information with information indicating that the optical signal exists; and determining means in each of said plurality of nodes for: operating in the same clock cycle as that in which the updating means updates the information; reading the information having not been updated; and determining, on the basis of the read information, whether to transmit the optical signal in parallel with updating of the information by the updating means.

2. The optical network system according to claim 1, wherein:

when the information included in the time-division slot indicates that no optical signal exists, the updating means updates the information with information indicating that an optical signal exists; and when the information included in the time-division slot indicates that an optical signal exists, the updating means overwrites the information with information indicating that an optical signal exists.

3. The optical network system according to claim 1, wherein an optical signal includes node identification information for identifying the node having transmitted the optical signal, the optical network system further comprising:
controlling means for transmitting a hold signal to the node identified by the node identification information for suspending transmission of an optical signal of the wavelength or the positional space allocated to the node, said transmission taking place when the number of times the same node identification information has been received exceeds a predetermined number within predetermined time.

4. The optical network system according to claim 3, wherein the node further includes suspending means for receiving a hold signal from the controlling means and suspending transmission of an optical signal of the specified wavelength or the specified positional space.

5. The optical network system according to claim 3, wherein a hold signal is an optical signal of a wavelength or a positional space that is not allocated to the plurality of nodes.

6. A method for memory access performed among a plurality of nodes via a ring network formed in the shape of a ring, different wavelengths or positional spaces of a transmission line being allocated the plurality of nodes, each of the nodes receiving only an optical signal of the allocated wavelength or the allocated positional space to allow access to a memory provided in the node and transmitting optical signals of the wavelengths or the positional spaces allocated to the other nodes to memories provided in the other nodes, the ring network performing time division multiplexing transmission of a plurality of optical signals from the plurality of nodes, wherein the method comprises the steps of:
indicating whether an optical signal to be transmitted exists in the time-division slot, said indication occurring in the ring network in which time-division slots for transmitting optical signals of the wavelengths or the positional spaces allocated to the individual nodes are formed, without checking information included in the time-division slot corresponding to a node that receives an optical signal;
updating the information included in the time-division slot with information indicating that the optical signal exists;
reading the information having not been updated in the same clock cycle as that in which the updating step updates the information; and
determining, on the basis of the read information, whether to transmit the optical signal in parallel with the updating step.

7. The memory access method according to claim 6, wherein:
when the information included in the time-division slot indicates that no optical signal exists, the updating step updates the information with information indicating that an optical signal exists.

8. The memory access method according to claim 6, wherein an optical signal includes node identification information for identifying the node having transmitted the optical signal, the method further comprising a step of:
when the number of times the same node identification information has been received exceeds a predetermined number within predetermined time, transmitting, to the node identified by the node identification information, a hold signal for suspending transmission of an optical signal of the wavelength or the positional space allocated to the node.

9. The memory access method according to claim 8, further comprising a step of receiving a hold signal and suspending transmission of an optical signal of the specified wavelength or the specified positional space.

10. The memory access method according to claim 8, wherein a hold signal is an optical signal of a wavelength or a positional space that is not allocated to the plurality of nodes.

11. A computer-readable storage medium tangibly embodying computer-executable program instructions which, when executed, cause a computer to perform the memory access method of claim 6.

12. A computer-readable storage medium tangibly embodying computer-executable program instructions which, when executed, cause a computer to perform the memory access method of claim 7.

13. A computer-readable storage medium tangibly embodying computer-executable program instructions which, when executed, cause a computer to perform the memory access method of claim 8.

* * * * *